No. 869,185. PATENTED OCT. 22, 1907.
M. LATOUR.
SELF EXCITING ALTERNATING CURRENT DYNAMO.
APPLICATION FILED JULY 9, 1901.

2 SHEETS—SHEET 1.

Witnesses.
Benjamin B. Hull,
Helen Oxford

Inventor.
Marius Latour.
by Allen S. Davis
Atty.

No. 869,185. PATENTED OCT. 22, 1907.
M. LATOUR.
SELF EXCITING ALTERNATING CURRENT DYNAMO.
APPLICATION FILED JULY 9, 1901.

2 SHEETS—SHEET 2.

UNITED STATES PATENT OFFICE.

MARIUS LATOUR, OF SÈVRES, FRANCE, ASSIGNOR TO GENERAL ELECTRIC COMPANY, A CORPORATION OF NEW YORK.

SELF-EXCITING ALTERNATING-CURRENT DYNAMO.

No. 869,185.            Specification of Letters Patent.            Patented Oct. 22, 1907.

Application filed July 9, 1901. Serial No 67,668.

*To all whom it may concern:*

Be it known that I, MARIUS LATOUR, engineer, a citizen of the French Republic, residing at Sèvres, Seine, France, and having post-office address 52 Rue de la Mouesse, in the said city, have invented certain new and useful Improvements in Self-Excited Alternating-Current Dynamos, of which the following is a specification.

This invention has for its object improvements in self-excited alternating-current dynamos whereby it is possible to obtain with polyphase currents an inducing magnetic field which is substantially constant both as regards magnitude and direction relatively to the iron of the inductor, as in the case of direct-current machines.

In order that the following description and claims may be well understood it is necessary to define the sense in which I use certain expressions. A machine is said to be synchronous whenever the induced magnetic field is fixed in position with respect to the rotor, and asynchronous whenever the induced magnetic field is not fixed in position with reference to the rotor.

In the following description of my improved alternator, I shall use the expression "synchronous machine" as applying to machines in which the degree of departure from the strictly synchronous machine, as defined in the preceding paragraph, is of the magnitude of the slip in induction machines. The slip may be either positive or negative.

Figure 1:
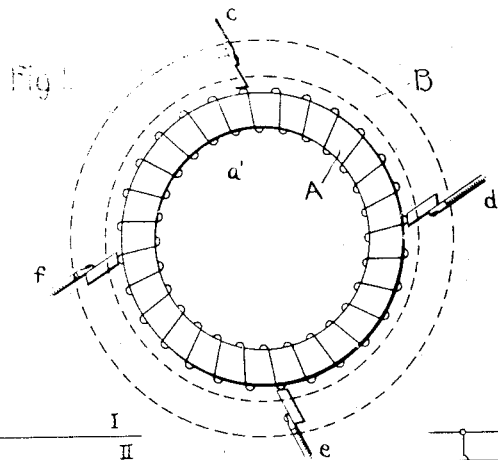
Figure 2:
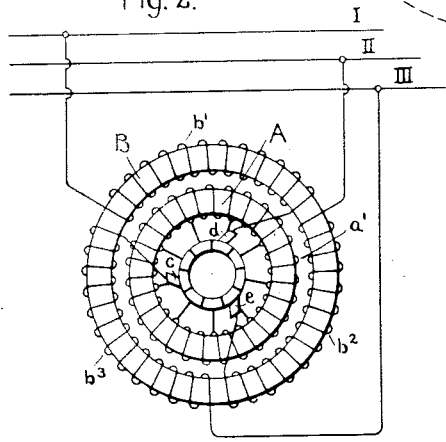
Figure 3:
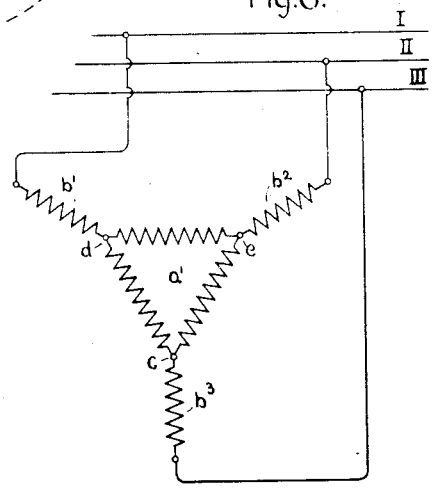
Figure 4:
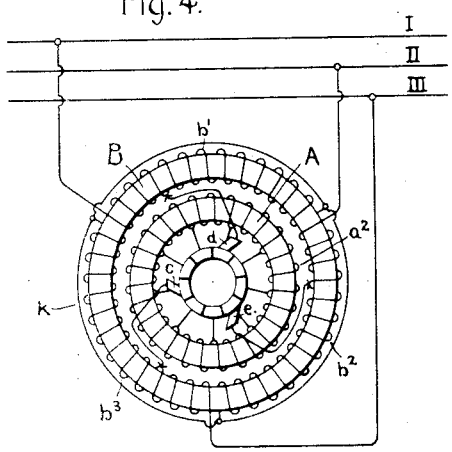
Figure 5:
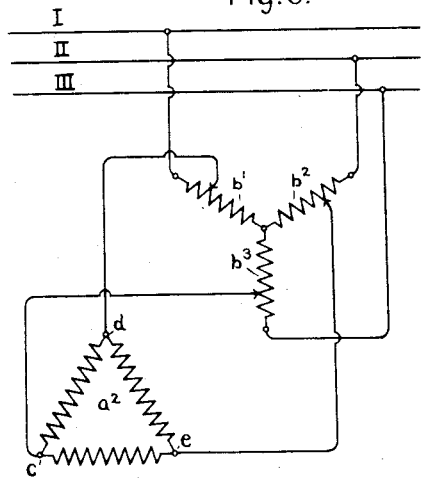
Figure 6:
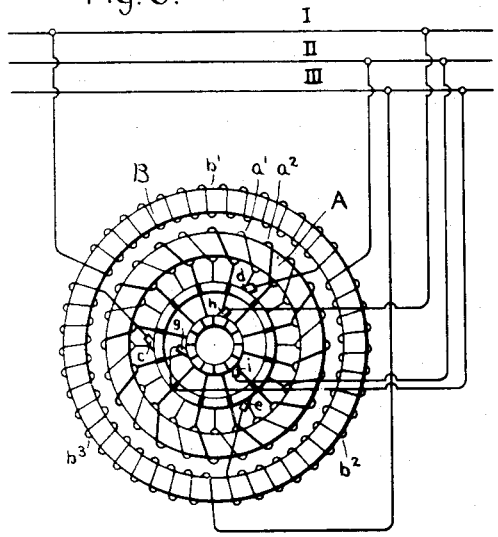
Figure 7:
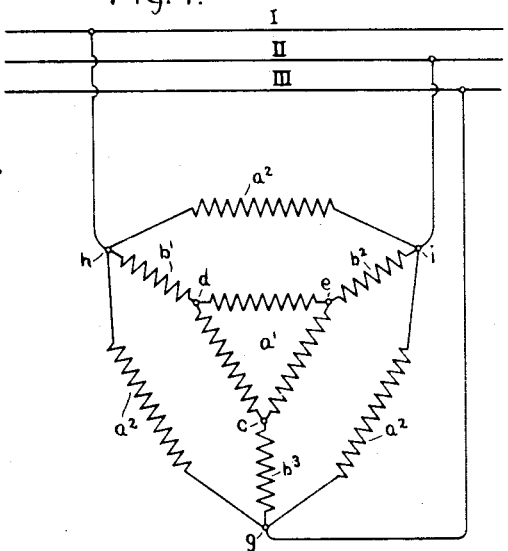
Figure 8:
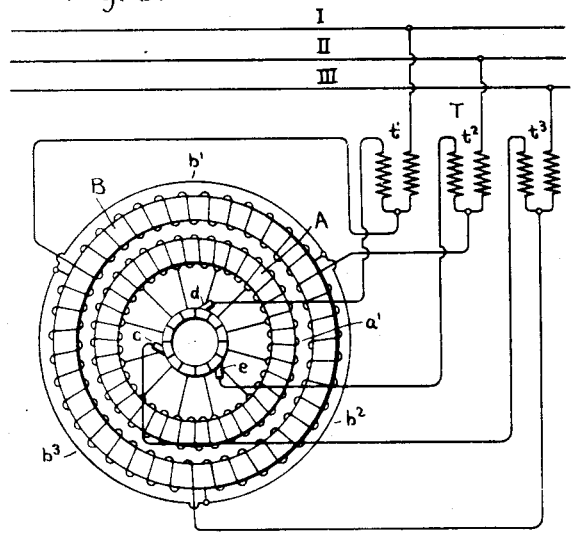
Figure 9:
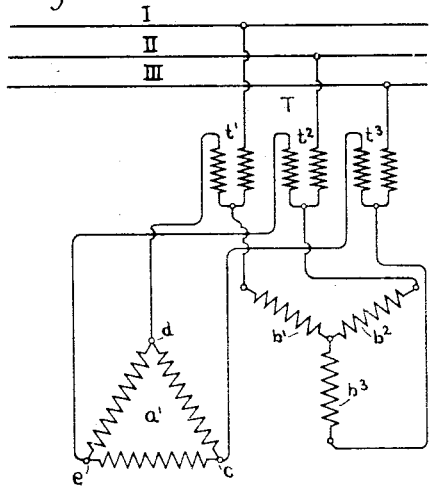

I will describe my improvements and a few of their applications to alternating-current machines by reference to the accompanying drawing in which:

Figure 1 is a diagram illustrating the general principle on which the construction of my improved alternator is based, presuming that two-phase currents are being dealt with. Fig. 2 shows, in accordance with the usual diagrammatic method, the application of this principle to a series-excited alternator in which a bipolar field is obtained by means of three-phase currents. Fig. 3 shows, diagrammatically, the connections required for the series self-excitation of the alternator shown in Fig. 2. Fig. 4 shows the application of my invention to a shunt-excited alternator. Fig. 5 shows diagrammatically the connections required for the shunt self-excitation of the alternator shown in Fig. 4. Fig. 6 shows the application of my invention to a self-compounding alternator. Fig. 7 shows diagrammatically the connections required for the excitation of the alternator shown in Fig. 6. Fig. 8 shows a modified arrangement for a self-compounding alternator in which a compounding transformer is used. Fig. 9 shows diagrammatically the connections required for the excitation of the alternator shown in Fig. 8.

The fundamental principle which is applied to all the exciting arrangements of the alternator forming the object of my invention is as follows:

Let it be supposed that a stationary Gramme-ring A (Fig. 1) whose conductors are laid bare on the periphery so as to form a commutator, is placed in a homogeneous magnetic medium, such as a ring B of soft iron, from which it is separated only by a small air gap. To four brushes $c\,d\,e\,f$, which are 90° apart from each other, let two-phase currents be supplied, the frequency of which is $\omega$, the brushes $c\,e$, for instance, serving for the passage of the current $I \sin. 2\pi\omega t$, and the brushes $d\,f$ serving for the passage of the current $I \cos. 2\pi\omega t$. A flux $\varphi$ is thus obtained revolving with the angular velocity $2\pi\omega$. The rotation of this flux involves losses due to hysteresis and Foucault currents in the iron mass, this rotation being further rendered more evident by the high self-induction of the system; this self-induction is brought into evidence by the voltage between brushes which is much higher than the mere ohmic drop would account for. But while the aforesaid ring is still remaining stationary and without concerning ourselves for the present with the sparking that might take place, let the four brushes $c\,d\,e\,f$ be caused to rotate in a direction opposite to that of the revolving flux, and with an angular velocity precisely equal to $2\pi\omega$; we shall, by this means insure immediately the fixity of the flux $\varphi$. The ring of soft iron is then always magnetized in the same direction, and in the same sense, with the same intensity. In this case there will be no losses caused by hysteresis or Foucault currents and the ring may then be either solid, or laminated, and without insulation. But what is still more remarkable is that this system is devoid of self-induction for the source of polyphase current, owing to the fact that the brushes are rotated. As a matter of fact the resulting flux becomes absolutely stationary relatively to the ring conductors; it could not therefore induce any electromotive force whatsoever in the latter. All induction phenomena therefore disappear and the voltage between the brushes becomes strictly equal to the ohmic drop in the winding of the ring. In other words, the system, although it enables an inducing flux to be disposed of, no longer takes wattless currents from the source of three-phase current and, in the example under consideration, a bipolar inducing system is obtained having fixed north and south poles in the iron and utilizing solely the working components of the alternate currents for its excitation. Instead of rotating the brushes we may leave them stationary, and cause the ring to rotate with the speed of synchronism. Then we shall have an inducing system revolving in space after the fashion of the inductor of a synchronous alternator whose armature is fixed. If the inducing system be caused to revolve within the armature of an alternator, a part of the currents generated may be utilized for the excitation of the inducing system itself, as is done with direct-current dynamos. This excitation will absorb only the working components of the alternate currents.

I have in the foregoing reserved the question of sparking for a later consideration. It is easy to see that there cannot be any sparking. A simple way of accounting for this is that as each section of the ring is always traversed by the same flux, there cannot be any electromotive force induced in those sections short-circuited under the brushes.

I will now describe the application of the foregoing considerations to the design of self-exciting alternators. My improved self-exciting alternators consist of two rings, namely, an outer stationary ring B, or stator, which is identical with the armature of a synchronous, or asynchronous, alternator, and an internal movable ring A, which constitutes the rotor or magnetic field. The latter may consist of a solid or of a laminated ring of soft iron. It carries a winding of the drum pattern for example and a commutator of very small dimensions in comparison with the dimensions of the rotor. Apart from this the general arrangement of the rotor is analogous to that of the armature of a direct-current dynamo. The air gap between the two rings is always, without any other consideration, reduced as much as good workmanship will permit. The conductors are situated in slots provided both within the stator and the rotor but in the latter the full depth of the slots is utilized.

I wi'l now explain how my systems of series, shunt and compound excitation may be carried out into practice in an alternator. I will further suppose that this alternator is a three-phase current generator.

*Series excitation.*—Referring first to Fig. 2, I, II, III, indicate the line conductors of a three-phase system of distribution. The stator armature B is provided with a three-phase star-connected winding. The several sections $b^1$, $b^2$, $b^3$ of the stator winding are closed in mesh connection with the rotor winding $a''$ through the medium of the commutator and the three brushes $c$, $d$, $e$. This star and mesh connection is shown more clearly in Fig. 3 which is a simplified diagram of the windings and connections of the alternator illustrated in Fig. 2.

The residual magnetism suffices for starting and the alternator operates as a three-phase alternating-current generator with its rotor excited by the same currents which flow through the stator winding. Instead of causing all the current to flow through the rotor windings, it is evident that the excitation might be effected through the interposition of a transformer. This is true also with respect to the other modes of excitation hereinafter described

*Shunt excitation.*—In an alternator arranged for shunt excitation (see Fig. 4), the star-connection of the stator windings is completed within the stator itself and the exciting currents for the rotor are taken either from the terminals of the stator winding (in which case the excitation voltage will be the full voltage of the generator) or from any points equidistant from the neutral point according to the excitation voltage desired. In Fig. 4 the several sections $b^1$, $b^2$, $b^3$ of the three-phase stator winding are shown connected in star through the conductor $k$, and the commutator brushes $c$, $d$, $e$ through which the three-phase current is supplied to the winding on the rotor are shown connected to points intermediate the terminal and neutral points of the several sections of the stator winding; the particular points of connection being chosen to give the desired excitation voltage. Fig. 5 shows in a simple diagram the connections of the windings of the alternator illustrated in Fig. 4.

*Compound excitation.*—Fig. 6 shows an alternator arranged for a compound excitation, the arrangement shown in this figure involving a superposition of the arrangements of Figs. 2 and 4. The stator is provided with a three-phase winding, comprising sections $b^1$, $b^2$, $b^3$ connected in star as before, and the rotor is provided with a winding comprising two different sections $a^1$ and $a^2$, each connected to its own commutator. One of these sections is adapted for series excitation and one for shunt excitation. Each commutator is provided with three equidistant brushes, and the set of brushes for the series excitation is connected in series with the windings on the stator, the brushes of the other set being connected either directly to the terminals of the stator winding as shown in Fig. 6 or to intermediate points in the several sections of the said winding as shown in Fig. 4. If the series winding on the rotor is so designed and the brushes are so positioned that the ampere turns due to this winding are always equal and opposite to the ampere turns of the stator, then the alternator will theoretically always remain in the condition of working without load and we shall obtain constant potential at the terminals irrespective of the load. The connections of the windings of the alternator shown in Fig. 6 are illustrated in a simplified diagram in Fig. 7.

A compound excitation may be obtained with only a single winding and commutator on the inducing member by using a compounding transformer. Such an arrangement is illustrated in Fig. 8 in which the commutator brushes through which the three-phase current is supplied to the inducing member are connected to the windings of a compounding transformer T in the main circuit of the alternator, in such a manner that any increase in the current flowing in the main circuit of the alternator will produce a corresponding increase in the current flowing in the exciting winding. Fig. 9 shows in a simplified diagram the connections of the windings of the alternator shown in Fig. 8.

I do not claim specifically in this case the shunt and compound-wound alternators described herein, since these inventions have been made the subject-matter of two divisional applications filed August 8, 1903; renewed February 27, 1907; Serial Nos. 359,610 and 359,611, respectively.

I desire it to be understood that my invention is entirely independent of any particular form of winding and of the number of poles, both of which may be varied without involving a departure from my invention.

What I claim as new and desire to secure by Letters Patent of the United States, is,

1. In a self-exciting alternating current generator, an armature having a distributed winding, a field having a distributed winding and a many part commutator, and means for supplying polyphase currents to said field winding through said commutator.

2. In a self-exciting alternating-current generator, a distributed polyphase armature winding, a distributed field winding provided with a commutator, and brushes and connections arranged to connect the field winding in series with the several phases of the armature winding, directly or through transformers.

3. In combination, an alternating-current generator comprising relatively rotatable members one of which is mechanically driven and each of which is provided with a polyphase winding, a commutator for one of said windings, brushes bearing on said commutator, polyphase connections from said brushes to the other winding, and a load-circuit supplied with current from said generator.

4. A self-exciting alternating-current generator consisting of two relatively rotatable members one of which is mechanically driven and each of which is provided with a distributed polyphase winding, a commutator for one of said windings, brushes bearing on said commutator, and polyphase connections between said brushes and the other winding whereby a rotary magnetic field is produced in said generator and the generator thus excites itself independently of any external source.

5. In combination, an alternating-current generator comprising relatively rotatable members one of which is mechanically driven and each of which is provided with a polyphase winding, a commutator for one of said windings, brushes on said commutator, polyphase connections from said brushes to the other windings arranged to place the two windings in series, and a load-circuit supplied with current from said generator.

6. In combination, an alternating-current generator comprising relatively rotatable members, one of which is mechanically driven and each of which is provided with a distributed winding, polyphase connections joining together said windings to provide paths for currents whereby the generator becomes self-exciting, and a load circuit supplied with current from said generator.

7. In combination, an alternating-current generator comprising relatively rotatable members, one of which is mechanically driven and each of which is provided with a distributed winding, polyphase series connections joining together said windings to provide paths for currents whereby the generator becomes self-exciting, and a load circuit supplied with current from said generator.

8. An alternating current generator having a distributed closed-circuit field winding connected at intervals to the segments of a many-part commutator.

In testimony whereof I have hereunto set my hand in presence of two subscribing witnesses.

MARIUS LATOUR.

Witnesses:
EDWARD P. MACLEAN,
EMILE KLOTZ.